United States Patent [19]
Borsuk et al.

[11] 4,279,467
[45] Jul. 21, 1981

[54] FIBER OPTIC CONNECTOR

[75] Inventors: Leslie M. Borsuk, Los Alamitos, Calif.; Catherine R. Ciardiello, Matthews, N.C.; Henry S. Heath, Jr., Fullerton, Calif.

[73] Assignee: International Telephone and Telegraph Corporation, New York, N.Y.

[21] Appl. No.: 90,887

[22] Filed: Nov. 5, 1979

[51] Int. Cl.³ .............................................. G02B 5/14
[52] U.S. Cl. .................................................. 350/96.21
[58] Field of Search ........................... 350/96.21, 96.22

[56] References Cited

U.S. PATENT DOCUMENTS

| | | | |
|---|---|---|---|
| 4,114,979 | 9/1978 | Heldt | 350/96.21 |
| 4,146,300 | 3/1979 | Kaiser | 350/96.21 |

FOREIGN PATENT DOCUMENTS

| | | | |
|---|---|---|---|
| 2636997 | 2/1978 | Fed. Rep. of Germany | 350/96.21 |
| 2811404 | 9/1978 | Fed. Rep. of Germany | 350/96.21 |
| 7507375 | 12/1975 | Netherlands | 350/96.21 |

OTHER PUBLICATIONS

I. S. Few, "Instrument for Testing Telecommunications Optical Fibres", in *Optical Engineering*, vol. 15, No. 3, May–Jun. 76.

*Primary Examiner*—Steward J. Levy
*Attorney, Agent, or Firm*—Thomas L. Peterson

[57] ABSTRACT

An actuated fiber optic connector is disclosed in which the plug and receptacle connector members are axially mated with the fiber optic ferrule in the plug connector member sliding into a V-shaped channel in the receptacle connector member with low insertion force to abut the receptacle fiber optic ferrule therein. A leaf spring is mounted in the channel. The plug connector member carries an actuating sleeve which engages a central portion of the leaf spring upon mating of the connector members urging the spring inwardly into the V-channel. The spring is constructed such that when it is actuated, the spring biases both the ferrules in the connector into abutting relationship.

12 Claims, 5 Drawing Figures

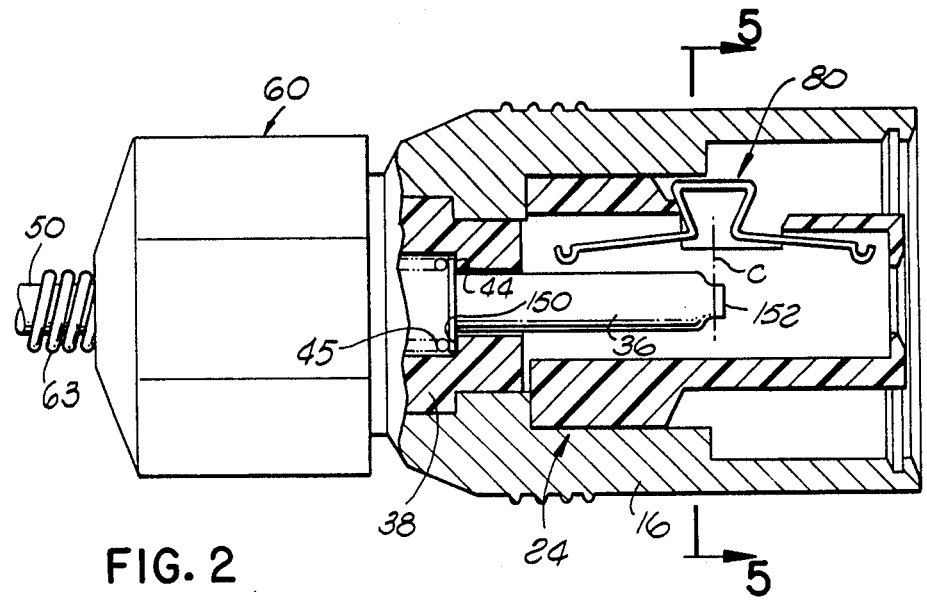
FIG. 2
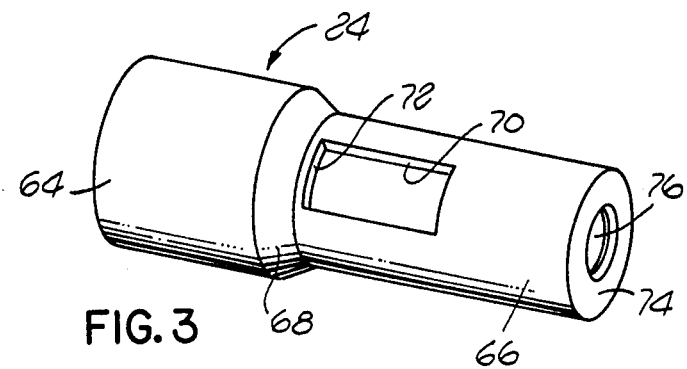
FIG. 3
FIG. 5
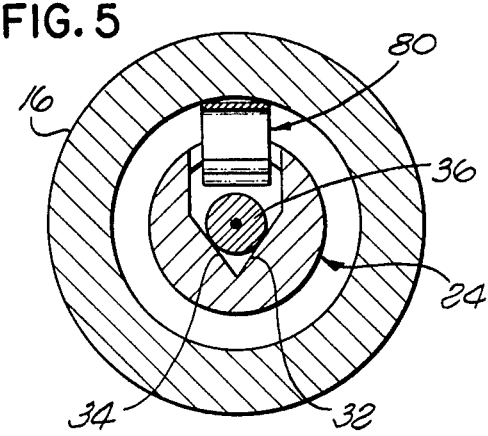
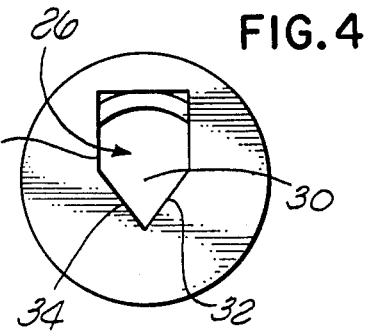
FIG. 4

FIBER OPTIC CONNECTOR

BACKGROUND OF THE INVENTION

The present invention relates generally to a fiber optic connector and, more particularly, to an actuated fiber optic connector.

Some fiber optic connectors are constructed in such a manner that when the mating connector halves of the connectors are interengaged, the optical fibers, or optical fiber ferrules therein, are aligned without further operations. An example of such a non-actuated connector is one in which the optical fiber ferrules are aligned by being pushed into the opposite ends of a precisely machined cylindrical guide sleeve. However, because of the close sliding fit of the ferrules in the guide sleeve, insertion forces are encountered in mating the connector halves, particularly for multi-channel connectors. Another well known means for aligning optical fiber ferrules is the use of a V-groove in which the ferrules are initially inserted with zero insertion force and thereafter are pushed into the bottom of the groove by a suitable compression plate or spring to align the optical fibers. Various forms of actuated fiber optic connectors utilizing the V-groove alignment concept are disclosed in the following U.S. Patents: U.S. Pat. No. 3,885,859 to Dalgleish et al.; U.S. Pat. No. 4,030,809 to Onishi et al.; and U.S. Pat. No. 4,142,777 to Gauthier et al.

Copending application of M. N. Sitabkhan entitled "Fiber Optic Connector," Ser. No. 061,057, filed July 26, 1979, discloses an actuated fiber optic connector in which the receptacle connector member is formed with the V-shaped channel having an optical fiber ferrule mounted therein. The ferrule of the plug connector member slides into the channel with zero insertion force when the plug and receptacle members are mated. A leaf spring is mounted in the channel. An axially slidable actuating sleeve surrounds the plug connector member. When the members are mated, the sleeve engages a radially shiftable plunger in the receptacle, forcing the plunger inwardly to automatically urge the spring, and thus the ferrules, into the V-channel to precisely laterally align the optical fibers in the ferrules. While such connector is generally satisfactory, the spring is constructed in such a manner that when it is actuated to push the ferrules into the V-channel, the spring tends to bias the ferrules apart thereby sometimes resulting in a gap occurring between the mating end faces of the ferrules, which results in light transmission losses through the connector.

The aforementioned Dalgleish patent discloses in FIGS. 6 to 10 a fiber optic connector for bare optical fibers in which a spring is actuated after mating of the connector halves which pushes the fibers into a V-groove. One portion of the spring would exert a forwardly direct biasing force on one of the fibers, but the other end of the spring would bias the other fiber rearwardly which would still result in a gap being created between the mating end faces of the fibers.

It is the object of the present invention to provide a fiber optic connector of the type in which a spring is utilized to urge fiber optic ferrules into a V-groove, but without the problem of transmission losses occurring due to biasing by the spring of one or both of the ferrules rearwardly in the connector.

SUMMARY OF THE INVENTION

According to the principal aspect of the present invention, there is provided a fiber optic connector comprising first and second mating connector members, each adapted to carry an optical fiber ferrule. The first connector member has a passage therethrough adapted to receive the ferrules in its opposite ends. The passage includes a pair of longitudinally extending flat sides disposed at an angle relative to each other defining a generally V-shaped channel. Spring means is provided in the passage adapted to be urged toward the channel for biasing the ferrules into the channel to align the optical fibers in the ferrules. Actuating means is provided for urging the spring means toward the channel. The spring means is adapted to exert forward biasing forces on both the ferrules upon actuation thereof by the actuating means thereby assuring abutment of the mating end faces of the ferrules and avoiding light transmission losses at the interface of the ferrules.

BRIEF DESCRIPTION OF THE DRAWINGS

FIG. 2 is a partial longitudinal sectional view through the forward mating end of the receptacle connector member illustrated in FIG. 1;

FIG. 3 is a perspective view of the ferrule alignment sleeve of the receptacle connector member;

FIG. 4 is a rear end view of the sleeve illustrated in FIG. 3; and,

FIG. 5 is a transverse sectional view taken along line 5—5 of FIG. 2.

DESCRIPTION OF THE PREFERRED EMBODIMENT

Figure 1:
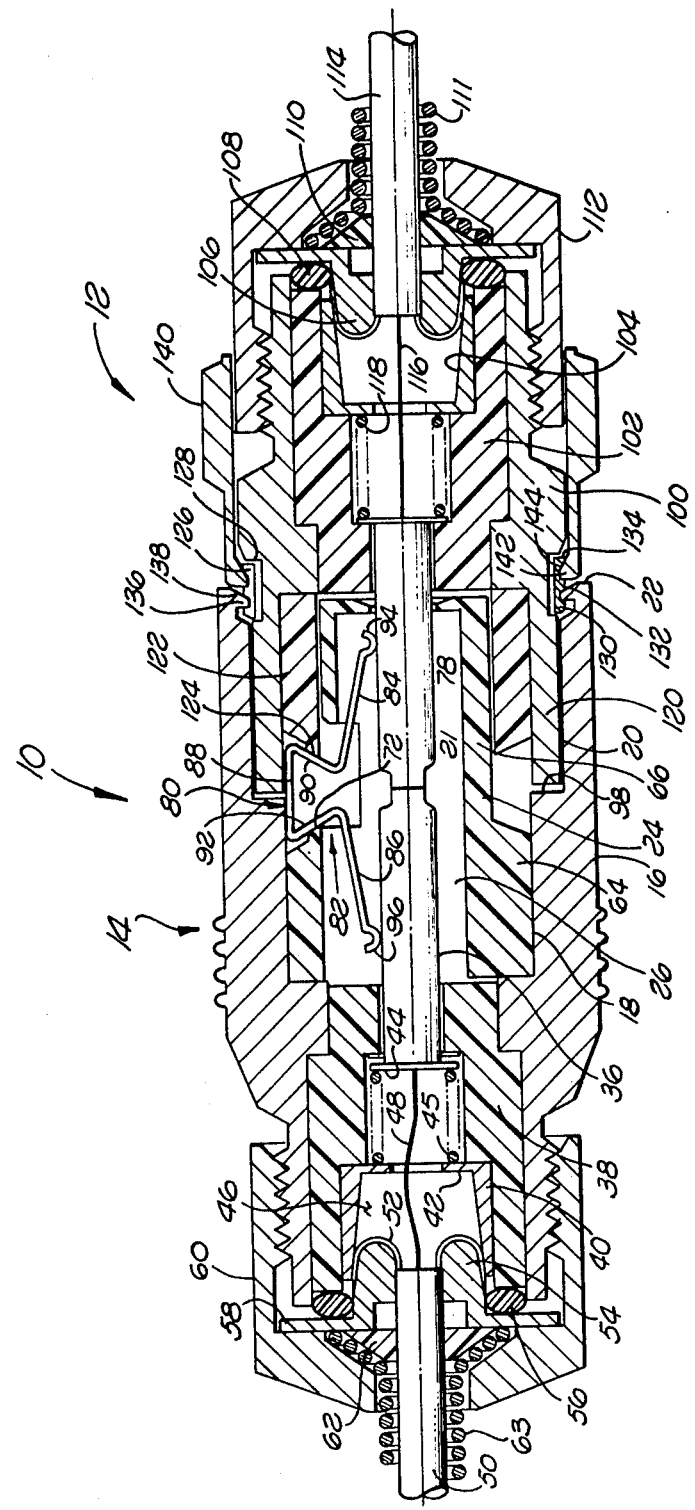
FIG. 1 is a partial longitudinal sectional view through the connector of the present invention showing the plug and receptacle members fully mated.

Referring now to the drawings in detail, the connector of the present invention, generally designated 10, comprises a plug connector member 12 and a receptacle connector member 14. The receptacle connector member comprises a generally cylindrical body 16 having a bore 18 extending axially therethrough. A counterbore 20 provides a cylindrical recess opening at the front mating end 22 of the receptacle connector member.

An alignment sleeve 24 is mounted in the bore 18 and extends forwardly into the recess 20 providing an annular channel 21 therebetween. The alignment sleeve has an axially extending passage 26 extending therethrough. The upper portion 28 of the passage has a rectangular cross-section. The bottom portion 30 of the passage is formed by intersecting flat, longitudinally extending sides 32 and 34 defining a V-shaped channel or groove.

A fiber optic ferrule 36 is slidably mounted in a retainer 38 mounted in the bore 18 behind the alignment sleeve 24. An internally tapered sleeve 40 is mounted in the rear of the retainer 38. The sleeve provides an inwardly extending annular flange 42. A coil spring 45 extending between the flange 42 and an outwardly extending flange 44 on the rear of the ferrule 36 biases the ferrule forwardly into the alignment sleeve 24. The interior of the sleeve 40 provides a flex chamber 46 for the optical fiber 48 of a single fiber cabel 50 extending into the rear of the receptacle body 16. The strength member 52 of the cable 50 is disposed between the rear inner surface of the sleeve 40 and a ring 54. An elastomeric O-ring 56 is positioned between an outwardly extending annular flange 58 on the ring 54 and the rear of the retainer 38. An end cap 60 is threaded onto the rear of the receptacle body. An elastomeric moisture seal 62 and strain relief coil spring 63 are mounted in the cap 60 and surround the cable 50. Threading of the cap 60 on the receptacle body compresses the O-ring 56, firmly traps the strength member 52 of the cable between ring 54 and sleeve 40, and compresses the seal 62 around the cable 50. The chamber 46 permits the optical fiber 48 to flex when the opposing ferrules of the plug and receptacle connector members are mated in the alignment sleeve 24.

As best seen in FIG. 3, the alignment sleeve of the receptacle connector member has an enlarged cylindrical rear portion 64 and a smaller diameter forward portion 66, with a beveled annular shoulder 68 joining the two portions. An axially extending rectangular opening 70 extends through the wall of the forward portion of the alignment sleeve immediately in front of the shoulder 68. The rear of the opening 70 provides a beveled cam surface 72. The forward end of the sleeve 24 embodies an inwardly extending annular flange 74 providing a central opening 76 dimensioned to slidably receive therein the ferrule 78 of the plug connector member 12 when the connector members are mated.

A leaf spring 80 is mounted in the alignment sleeve 24. The spring includes a central section 82, a forward spring arm 84 and a rear spring arm 86. The central section 82 of the spring has a dovetail configuration, and includes an axially extending leg 88, an inwardly and rearwardly extending forward leg 90 and an inwardly and forwardly extending rear leg 92. The spring arm 84 is joined to the end of the leg 90, and extends inwardly toward the V-channel 30, while the spring arm 86 is joined to the rear leg 92 and likewise extends toward the V-channel. The arm 86 terminates in a U-shaped end portion 96 positioned to engage the ferrule 36. In the relaxed condition of the leaf spring 80, the end portions 94 and 96 of the spring are positioned sufficiently high in the passage 26 so as not to contact the ferrules, whereby the ferrule 78 in the plug connector member may enter into the alignment sleeve with zero insertion force upon initial mating of the connector halves.

It will be noted that the opening 70 in the alignment sleeve and thus the central section 82 of the spring are located in front of the bottom 98 of the recess 20 in the receptacle body so that the forward leg 90 of the spring is exposed in the channel 21 whereby it may be engaged by the plug connector member in a manner which will be described in detail later herein. The rear leg 92 of the spring engages the beveled cam surface 72 on the alignment sleeve.

The plug connector member 12 comprises a cylindrical body 100 containing a retainer 102 similar to the retainer 38 in which the ferrule 78 is slidably mounted. A cable strength member clamping sleeve 104 and ring 106, O-ring 108, elastomeric grommet 110, strain relief spring 111 and cap 112 are provided on the rear of the body 100 similar to the receptacle connector member 14. A fiber optic cable 114 passes through the rear of the plug connector body, and the optical fiber 116 thereof is connected to the ferrule 78. A coil spring 118 biases the ferrule 78 forwardly in the plug connector body as in the receptacle connector member.

The body 100 of the plug connector member embodies a cylindrical forward end portion 120 which is dimensioned to slide into the cylindrical recess 20 in the front of the receptacle connector member. The inner diameter of the cylindrical forward end portion 120 is sufficiently great to allow the forward end to slide freely over the central section 82 of the leaf spring when the connector members are mated.

An actuating sleeve 122 is fixedly mounted in the forward end portion 120 of the plug connector member. The actuating sleeve is dimensioned to slide over the forward portion 66 of the alignment sleeve 24. The forward end of the actuating sleeve 122 is formed with a beveled cam surface 124 which is adapted to engage the leg 90 of the leaf spring when the connector members are mated.

A longitudinally split locking ring 126 is mounted in an annular groove 128 in the outer surface of the plug body 100. The locking ring embodies three longitudinally spaced annular ridges 130, 132 and 134, each having a forwardly directed bevel. An inwardly extending flange 136 is formed on the front of the receptacle body 16. The forward end of the flange embodies an inner forwardly facing bevel 138. An axially slidable collar 140 is mounted on the plug connector body 100. The collar embodies an inwardly extending flange 142 formed with an inner rearwardly facing bevel 144.

As seen in FIG. 2, when the receptacle connector member is disengaged from the plug connector member, the spring 45 biases the ferrule 36 forwardly until the flange 44 on the rear of the ferrule engages a rearwardly facing shoulder 150 on the interior of the retainer 38. With the ferrule biased to its forward position, the front mating end 152 thereof is in front of the mating interface line C of the ferrules 36 and 78. Likewise, the ferrule 78 is biased to a forward position by the spring 118 in the plug connector member. Thus, when the plug and receptacle connector members are mated, the forward end faces of the ferrules initially abut in front of the center line C and thereafter the ferrules shift rearwardly against the resilient force of the springs 45 and 118 until the ferrule faces reach line C. When using a conventional type of leaf spring to bias the ferrules into a V-shaped channel, as in the aforementioned Sitabkhan invention, the rearward forces produced by actuating such leaf spring may result in separation of the mating end faces of the ferrules in spite of the fact that the ferrules are biased forwardly by coil springs similar to springs 45 and 118. This problem is overcome by the novel leaf spring and actuating sleeve arrangement disclosed herein, the operation of which will now be described.

As the plug and receptacle connector members are initially mated, the forward portion 120 of the plug body 100 slides into the recess 20 in the receptacle body, and the ferrule 78 of the plug connector member slides with zero insertion force into the V-channel in the receptacle. The bevel on the front face of the ridge 130 of locking ring 126 engages the bevel 138 on the receptacle body 16 thereby causing the split ring to contract so that it may pass under the flange 136. After the ridge 130 passes under the flange, the ring expands causing the flange to enter the groove defined between the ridges 130 and 132, thereby locking the plug and receptacle connector members.

During this mating operation, the actuating sleeve 122 slides over the forward portion of alignment sleeve 24 bringing the beveled cam surface 124 on the front of the sleeve into engagement with the forward leg 90 of the central section of the leaf spring 80. As full mating of the connector members is completed, the central section 82 of the leaf spring is axially compressed between the cam surfaces 72 and 124, causing the forward leg 90 of the spring to pivot rearwardly whereby the forward spring arm 84 pivots inwardly and rearwardly, and causes the rear leg 92 to pivot forwardly whereby the rear spring arm 86 pivots forwardly and inwardly, simultaneously pushing the ferrules 78 and 36, respectively, into the V-channel and urging the ferrules forwardly into abutting relationship. Thus, it is seen that axial compression of the central dovetail section 82 of the spring results in an axial force component being applied to the ferrule 36 urging it forwardly in the V-channel, and a like force component urging the ferrule 78 forwardly in the V-channel against the ferrule 36. Thus, by the novel design of the leaf spring and actuating sleeve of the present invention, the problem of a gap occurring between the mating interfaces of the fiber optic ferrules, and thus light transmission losses therebetween, is eliminated. It will be further appreciated that actuation of the spring and alignment of the ferrule is achieved automatically upon axial mating of the plug and receptacle connector members. Thus, no secondary operation is required to achieve alignment of the optical fibers in the low insertion force connector of the present invention.

When it is desired to disconnect the plug and receptacle connector members, the collar 140 is shifted rearwardly whereby the bevel 144 on the interior of the collar cooperates with the bevel on the ridge 134 of the locking ring to cam the ring inwardly thereby causing it to contract into the groove 128 and allowing the forward ridge 130 of the locking ring to pass under the flange 136 of the receptacle body 16. Retraction of the collar 140 also withdraws the plug connector member 12 from the receptacle connector member, and thus removes actuating sleeve 24 from spring leg 90, whereby the leaf spring 80 is allowed to return to its normal relaxed position out of engagement with the ferrules 36 and 78 thereby facilitating low force release of the connector halves.

What is claimed is:

1. A fiber optic connector comprising:
   first and second mating connector members each adapted to carry an optical fiber ferrule;
   said first connector member having a passage therethrough adapted to receive the ferrules in its opposite ends;
   said passage including a pair of longitudinally extending flat sides disposed at an angle relative to each other defining a generally V-shaped channel;
   spring means in said passage adapted to be urged toward said channel for biasing the ferrules into said channel to align the optical fibers in the ferrules;
   actuating means movable relative to said spring means for urging said spring means toward said channel; and
   said spring means being adapted to exert forward biasing forces on both the ferrules upon actuation thereof by said actuating means.

2. A fiber optic connector as set forth in claim 1 wherein:
   said actuating means automatically urges said spring means toward said channel upon mating of said connector members.

3. A fiber optic connector as set forth in claim 1 wherein:
   said spring means includes a central section and a pair of spring arms extending in opposite axial directions from said central section, each said arm being located to engage a ferrule; and
   said actuating means engages said central section of said spring means to actuate said spring arms.

4. A fiber optic connector as set forth in claim 3 wherein:
   said connector members are axially matable;
   said first connector member includes a radial opening communicating with said passage;
   said central section of said spring means extending outwardly through said opening; and
   said actuating means comprising a forwardly extending member on said second connector member engaging said central section of said spring means upon axial mating of said connector members.

5. A fiber optic connector as set forth in claim 3 wherein:
   said central section of said spring means has a generally dovetail configuration providing an axially extending leg, a forward inwardly and rearwardly extending leg and a rear inwardly and forwardly extending leg;
   one of said spring arms being joined to said forward leg and extending forwardly therefrom and inwardly toward said channel; and
   the other of said spring arms being joined to said rear leg and extending rearwardly therefrom and inwardly toward said channel.

6. A fiber optic connector as set forth in claim 5 wherein:
   said actuating means embodies a beveled cam surface engageable with said forward leg for effecting rearward pivotable movement thereof whereby said one spring arm pivots inwardly and rearwardly.

7. A fiber optic connector as set forth in claim 6 wherein:
   said first connector member embodies a forwardly directed beveled cam surface engagable with said rear leg for effecting forward pivotable movement thereof whereby said other spring arm pivots inwardly and forwardly.

8. A fiber optic connector as set forth in claim 5 wherein:
   said actuating means functions to axially compress said central section of said spring means to cause said one spring arm to pivot inwardly and rearwardly and said other spring arm to pivot inwardly and forwardly.

9. A fiber optic connector as set forth in claim 5 wherein:
   said connector members are axially matable;
   said first connector member comprises a body having a bore therethrough and a forwardly opening enlarged recess;
   a sleeve is mounted in said bore extending forwardly into said recess and spaced radially from the wall thereof defining an annual channel therebetween, said passage being provided in said sleeve;
   a radial opening extending through the wall of said sleeve opposite to said V-shaped channel and in front of the bottom of said recess;
   said central section of said spring means extending outwardly through said opening into said annular channel; and
   said actuating means comprising a forwardly extending sleeve on said second connector member slidable into said annular channel for engaging said central section of said spring means upon mating of said connector members.

10. A fiber optic connector as set forth in claim 9 wherein:
said actuating means functions to axially compress said central section of said spring means to cause said one spring arm to pivot inwardly and rearwardly and said other spring arm to pivot inwardly and forwardly.

11. A fiber optic connector as set forth in claim 2 wherein:
said first connector member comprises a body having a recess therein opening at its forward mating end;
said actuating means comprises a sleeve portion on said second connector member slidable into said recess upon mating of said connector members; and
said spring means has an actuating surface exposed in said recess and engageable by said sleeve portion.

12. A fiber optic connector comprising:
first and second mating connector members each carrying an optical fiber ferrule;
said first connector member having a passage therethrough receiving one of said ferrules in one end thereof;
the ferrule in said second connector member being slidable into the other end of said passage upon mating of said connector members;
said passage including a pair of longitudinally extending flat sides disposed at an angle relative to each other defining a generally V-shaped channel;
spring means in said passage adapted to be urged toward said channel for biasing said ferrules into said channel to align the optical fibers in said ferrules;
actuating means movable relative to said spring means for urging said spring means toward said channel; and
said spring means exerting forward biasing forces on both said ferrules upon actuation thereof by said actuating means.

* * * * *